(12) United States Patent
Linderyd et al.

(10) Patent No.: US 6,953,030 B2
(45) Date of Patent: Oct. 11, 2005

(54) METHOD FOR FUEL INJECTION IN A COMBUSTION ENGINE AND COMBUSTION ENGINE

(75) Inventors: Johan Linderyd, Sundbyberg (SE); Anders Larsson, Södertälje (SE); Christer Mattsson, Norrtälje (SE)

(73) Assignee: Scania CV AB (publ) (SE)

( * ) Notice: Subject to any disclaimer, the term of this patent is extended or adjusted under 35 U.S.C. 154(b) by 11 days.

(21) Appl. No.: 10/478,486

(22) PCT Filed: May 15, 2002

(86) PCT No.: PCT/SE02/00917

§ 371 (c)(1),
(2), (4) Date: May 10, 2004

(87) PCT Pub. No.: WO02/095210

PCT Pub. Date: Nov. 28, 2002

(65) Prior Publication Data

US 2004/0177834 A1 Sep. 16, 2004

(30) Foreign Application Priority Data

May 21, 2001 (SE) .............................................. 0101792

(51) Int. Cl.⁷ ................................................ F02B 47/08
(52) U.S. Cl. ............. 123/568.12; 123/431; 123/568.15; 123/568.2
(58) Field of Search ................................ 123/295–305, 123/431, 568.11, 568.12, 568.15, 568.2, 568.21, 553, 557

(56) References Cited

U.S. PATENT DOCUMENTS

| | | | |
|---|---|---|---|
| 4,373,498 A | | 2/1983 | Ushimura |
| 4,424,780 A | * | 1/1984 | Trucco ................... 123/568.15 |
| 5,517,976 A | | 5/1996 | Bachle et al. |
| 5,746,189 A | * | 5/1998 | Kuzuya et al. ......... 123/568.15 |
| 6,092,512 A | * | 7/2000 | Ma ........................ 123/568.15 |
| 6,561,157 B2 | * | 5/2003 | zur Loye et al. ........... 123/305 |
| 6,725,827 B2 | * | 4/2004 | Ueda et al. .................. 123/295 |
| 6,742,506 B1 | * | 6/2004 | Grandin .................... 123/568.2 |

FOREIGN PATENT DOCUMENTS

| | | |
|---|---|---|
| FR | 2 696 787 | 4/1994 |
| GB | 2 320 056 | 6/1998 |

* cited by examiner

*Primary Examiner*—Erick Solis
(74) *Attorney, Agent, or Firm*—Ostrolenk, Faber, Gerb & Soffen, LLP

(57) ABSTRACT

A method for fuel injection in a four-stroke combustion engine (1) of piston-and-cylinder type with compression ignition, whereby a specified fuel quantity is supplied to a combustion chamber (2) for each working cycle, and whereby EGR gases are led back to the combustion chamber (2). At least a first portion of said fuel quantity is combined with hot EGR gases for supply to the combustion chamber (2). The invention also relates to a combustion engine working according to the method.

16 Claims, 1 Drawing Sheet

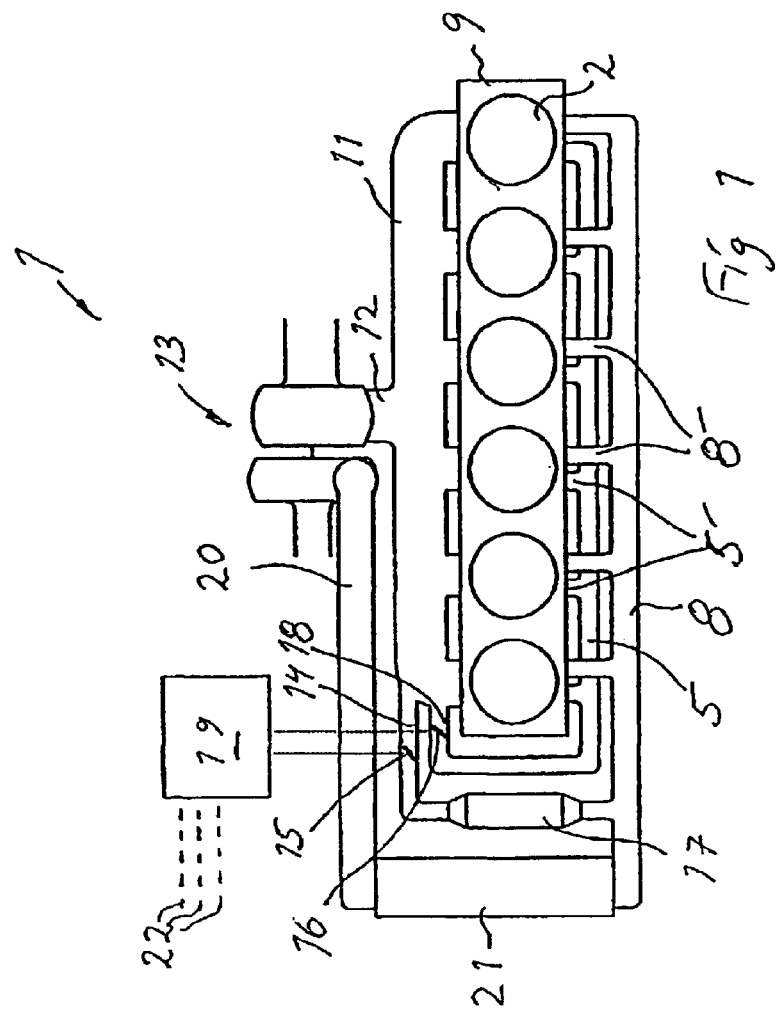
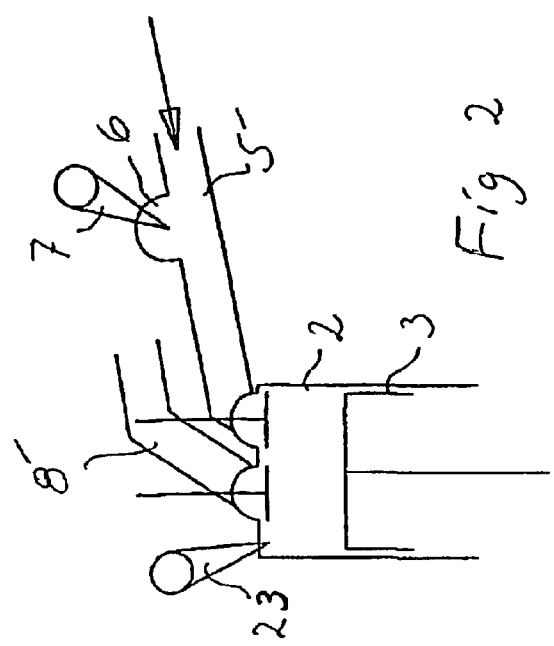

METHOD FOR FUEL INJECTION IN A COMBUSTION ENGINE AND COMBUSTION ENGINE

TECHNICAL FIELD

The present invention relates to a method for fuel injection in a combustion engine of piston-and-cylinder type comprising supplying fuel and EGR gases to the combustion chamber, and to a combustion engine which performs the method.

STATE OF THE ART

One problem of a conventional diesel engine is that it produces high $NO_x$ emissions. This occurs because, after fuel injection, combustion commences in a central portion of the combustion chamber and propagates thereafter along a front to other portions of the combustion chamber. The reason for the high $NO_x$ emissions is that very high combustion temperatures occur locally in the combustion front.

With a view to trying to eliminate this problem, a combustion process called HCCI has been developed. It is characterised by the fuel being injected in good time before the moment of ignition to allow time for the formation of a substantially homogeneous fuel mixture which is then ignited by compression in the combustion chamber when the piston is in the vicinity of its top dead centre position. In this situation, combustion does not take place along a front but simultaneously and relatively uniformly throughout the combustion chamber. The high temperatures which prevail along a combustion front and the associated problems arising from high combustion temperatures are thereby avoided.

HCCI engines afford considerable advantages comprising not only little or no $NO_x$ release but also high efficiency close to that of diesel engines. HCCI engines overcome said problems because the homogeneous mixture (with high λ point) results in lower combustion temperatures due to combustion being initiated substantially simultaneously within widespread regions of the combustion chamber. The overall result is more even temperature distribution without the occurrence in the cylinder of temperatures which give rise to $NO_x$.

It has been found that emission problems pertaining to harmful pollutants can thus be overcome in the kind of combustion engines which apply combustion of a homogeneous premixed fuel/air mixture. However, engines of this kind have a number of inherent disadvantages such as difficulty in actually achieving a homogeneous air/fuel mixture.

This applies in particular when operating with heavier fuels such as diesel oil. The reason is that with present-day technology it is difficult to achieve vaporisation of heavy fuels. This has resulted in much of HCCI engine development work being hitherto directed at operating with lighter fuels such as, for example, ethanol.

OBJECTS AND MOST IMPORTANT CHARACTERISTICS OF THE INVENTION

One object of the present invention is to indicate a method and a combustion engine whereby the disadvantages of the state of the art are eliminated or at least reduced.

A particular object of the invention is to provide a method and a combustion engine whereby it is possible to achieve better fuel vaporisation and hence to compress a more homogeneous fuel mixture.

This object is achieved according to the invention by means of the method for fuel injection in a four-stroke combustion engine of piston-and-cylinder type with compression ignition, whereby a specified fuel quantity is supplied to a combustion chamber for each working cycle, and whereby EGR gases are led back to the combustion chamber. At least a first portion of said fuel quantity is combined with hot EGR gases for supply to the combustion chamber. The invention also relates to a combustion engine working according to the method of the invention.

This means that the energy in the transferred hot EGR (Exhaust Gas Recycling) gases is used for vaporising the fuel before it enters the combustion chamber. The result is not only a more intensively homogeneous mixture but also the possibility of engine operation with fuels which are more difficult to vaporise, such as diesel oil. The possibility is nevertheless not excluded that the invention may also be applied with, for example, ethanol, which is easy to vaporise but difficult to ignite, since fuels of this kind also have advantages.

According to a preferred aspect of the invention, the fuel is mixed with EGR gases before it is supplied to the combustion chamber, thereby creating good conditions for achieving good vaporisation and making it possible to obviate expensive direct injection equipment.

Engine operation can be optimised, depending on load, by varying the relationship between the first and second EGR portions.

Further advantages are achieved by the features in the other dependent claims.

BRIEF DESCRIPTION OF THE DRAWINGS

The invention will now be described in more detail on the basis of an exemplifying embodiment with reference to the attached drawings, in which:

FIG. 1 depicts schematically a combustion engine according to the invention in conjunction with a control system, and FIG. 2 depicts schematically a detail of the combustion engine in FIG. 1.

DESCRIPTION OF AN EXEMPLIFYING EMBODIMENT

FIG. 1 depicts a combustion engine 1 according to the invention with a cylinder bank 9 of six cylinders, with a respective combustion chamber 2 belonging to each of these cylinders. The diagram also shows an induction manifold 9 and an exhaust manifold 11. The exhaust manifold 11 has its outlet 2 connected to a turbo unit 13. A first EGR valve 15 is arranged in a duct 14 via which cooled EGR gases are led to be supplied together with air to the respective combustion chambers via inlet ducts 8' from the induction manifold 8. Said first EGR valve 15 can be used to regulate the quantity of cooled exhaust gases which is fed back via the duct 14 and thereby passes through an EGR cooler 17.

Also provided is a second EGR valve 16, arranged in a further duct 18, for regulating the quantity of uncooled EGR gases to be led to a manifold 5 for uncooled EGR gases and thereby to individual ducts 5' which lead into the respective combustion chambers 2.

According to the invention, it is this uncooled portion which is used for vaporising the fuel supplied to the combustion chamber.

A line 20 is for charge air which comes from the turbo unit 13 and is intended to pass in a conventional manner through a charge air cooler 21 before entering the induction manifold 8.

The EGR valves 15 and 16 are controlled by a control unit 19 which is supplied in a conventional manner, via electrical lines represented by broken lines 22, with signals concerning engine operating parameters such as engine speed, load, engine temperature, accelerator position, exhaust gas composition etc.

The detail depicted schematically in FIG. 2 of the combustion engine 1 in FIG. 1 shows one of the cylinders with, movable in it, a piston 3 which delineates the combustion chamber 2. The combustion chamber 2 has leading into it inlet ducts 8' for inlet air and cooled EGR gases. The combustion chamber 2 also has leading from it an undepicted outlet duct. These ducts are provided with appropriate valves in a conventional manner.

In this embodiment, a cylinder head also incorporates a first fuel nozzle 23 for direct injection of fuel into the combustion chamber 2.

According to the invention, a second fuel nozzle 7 is also incorporated in the duct 5' to inject a fuel portion into a mixing space 6. This mixing space 6 may be an uncomplicated straight section of the duct 5', a broadened section or, as represented in FIG. 2, a swirl chamber. A flow of hot EGR gases led through the duct 5' is used to make it possible for the fuel supplied via the nozzle 7 to be vaporised in order to establish a fuel/gas mixture.

This mixture is introduced into the combustion chamber 2 for the creation of a substantially homogeneous fuel/air mixture to be established within the combustion chamber.

The control unit 19 is also designed to control an apparatus belonging to the engine for fuel supply via both the nozzles 7 and 23 in FIG. 2. The control unit 19 is preferably programmed to optimise not only the ratio between the quantities of fuel injected via these nozzles 7 and 23 but also the total quantity of fuel injected, and possibly also the timing of the respective injections relative to the engine's crankshaft angle. This optimisation is performed on the basis of detected operating parameters and also comprises control of EGR quantities, both cooled and uncooled, by regulation of said valves 15 and 16.

The invention may be varied within the scopes of the claims, in particular the ratio between the various EGR portions, i.e. the cooled EGR portion and the uncooled EGR portion, as also the fuel quantity proportions, as indicated above, may be adapted for different operating conditions. It is nevertheless possible to apply across the whole operating range a fuel quantity ratio which is in principle fixed. It is also possible according to the invention, particularly in the case of heavy fuels which are difficult to homogenise, to have injection entirely in conjunction with hot EGR gases, in which case the direct injection nozzle 23 is therefore omitted.

In a possible but not preferred embodiment there is no regulation by dampers or the like.

Regulation may nevertheless be achieved in many ways other than as described above, e.g. by regulating the inlet flow to the turbo unit on the basis of load and engine speed.

EGR gases may be extracted and fed back in various conventional ways, e.g. before or after the turbo unit and via various valve systems, venturi systems, pumps, long or short route etc.

To achieve a preferred type of operation, however, the EGR flows from the engine have to be regulated. This entails inter alia ensuring that the hot EGR gases really do contain sufficient energy not only to vaporise the fuel properly but also to prevent fuel re-condensing on the walls of the inlet system or in the cylinder or as soon as the mixture encounters cooled gas flows. This invention does of course not exclude the possibility of the EGR quantities being also regulated for conventional operating reasons.

It is preferable that the ratio between the first and second EGR gas portions be regulated on the basis of operating parameters such as engine speed, load, engine temperature, accelerator position and/or exhaust gas composition.

An important advantage of the whole fuel quantity being injected into, or in conjunction with, an EGR duct before the total mixture is introduced into the combustion chamber via a valve is that expensive equipment for direct injection of fuel into the cylinders is thus obviated. Equipment for port injection is substantially less expensive and less complicated. The invention makes effective port injection of even heavy fuels possible.

The possibility is not excluded, however, that the fuel quantity which is combined with hot EGR gases may be brought into contact with them at the actual stage of injection into the cylinder. This could be achieved by the fuel injection being effected into the hot EGR gas flow.

Another possibility for providing hot EGR gases for fuel vaporisation is to open an inlet valve to a cylinder temporarily at a time before the exhaust valve opens in order to release hot exhaust gases from the combustion in the various cylinders into the inlet duct. Fuel can thus be injected into these hot gases and led back to the combustion chamber during the inlet phase.

It should be noted that "hot" EGR gases means where appropriate "uncooled" but that the invention does not exclude the possibility of these gases having been subjected to a slight degree of cooling.

The invention may be applied to various fuels, which means that, for example, ethanol, methanol, gasoline or diesel oil may be used.

What is claimed is:

1. A method for fuel injection in an engine of piston-and-cylinder type with compression ignition, comprising:

supplying inlet air into a combustion chamber of an engine cylinder;

supplying a quantity of fuel to the combustion chamber in the engine cylinder, and driving each working cycle of the engine with air and the quantity of fuel in the combustion chamber, and producing hot EGR gases in the combustion chamber during the working cycle;

feeding the hot EGR gases back to the combustion chamber;

combining at least a first portion of the quantity of fuel with at least a first portion of the hot EGR gases before the combined quantity of fuel and EGR gases are mixed with the inlet air;

supplying the quantity of fuel includes supplying the combined first portion of the quantity of fuel and the first portion of the EGR gases to the combustion chamber; and cooling a second portion of the hot EGR gases; and passing the cooled second portion of the EGR gases to the combustion chamber.

2. A method according to claim 1, further comprising combining the first portion of the quantity of fuel with the hot EGR gases in a space before the combined first portion of the quantity of fuel and the first portion of the EGR gases is supplied to the combustion chamber in the supplying step.

3. A method according to claim 1, further comprising regulating a ratio between the first and second EGR gas portions on the basis of at least one operating parameter selected from the group consisting of engine speed, load on the engine, engine temperature, accelerator position and exhaust gas composition.

4. A method according to claim 1, wherein the quantity of fuel comprises a fuel selected from the group consisting of ethanol, methanol, gasoline and diesel oil.

5. A method according to claim 1, further comprising supplying a second portion of the quantity of fuel directly into the combustion chamber without combining the second portion of the quantity of fuel with the hot EGR gases.

6. A method according to claim 5, further comprising regulating a ratio between the first and second portions of the quantity of fuel on the basis of at least one operating parameter selected from the group consisting of engine speed, load on the engine, engine temperature, accelerator position and exhaust gas composition.

7. A method according to claim 1, further comprising coordinating a ratio between the first and second portions of the quantity of fuel and a ratio between the first and second portions of the EGR gases such that the first portion of the EGR gases has sufficient energy relative to the first portion of the quantity of fuel to vaporize the quantity of fuel and to prevent condensation of the quantity of fuel during engine operation.

8. A method according to claim 1, further comprising coordinating the first portion of the quantity of fuel with the hot EGR gases such that the hot EGR gases have sufficient energy relative to the first portion of the quantity of fuel to vaporize the first portion of the quantity of fuel and to prevent condensation of the quantity of fuel during engine operation.

9. The method of claim 1, further comprising mixing the combined quantity of fuel and EGR gases with the inlet air occurs inside the combustion chamber.

10. A combustion engine of a piston-and-cylinder type and having compression ignition, the engine comprising:
- at least one cylinder with a respective combustion chamber having an outlet, at least one inlet, and working cycles;
- a supply apparatus for supplying a specified quantity of fuel to the combustion chamber for each working cycle in the combustion chamber;
- a feedback device for leading hot EGR gases produced during the working cycles from the combustion chamber, through the outlet, and back to the combustion chamber through the at least one inlet;
- a combining apparatus for combining at least a first portion of the quantity of fuel with at least a first portion of the hot EGR gases from the outlet before the combined quantity of fuel and EGR gases are mixed with inlet air; and
- a device for cooling a second portion of the hot EGR gases from the outlet and for supplying the cooled second portion of the EGR gases to the combustion chamber.

11. An engine according to claim 10, wherein the at least one inlet comprises a space before the combustion chamber, and the combining apparatus is operable to combine the first portion of the quantity of fuel with the first portion of the hot EGR gases in the space.

12. An engine according to claim 11, wherein the space is a swirl chamber.

13. An engine according to claim 10, further comprising a control unit operable to control the supply apparatus to regulate the quantity of fuel supplied to the combustion chamber on the basis of operating parameters.

14. An engine according to claim 10, further comprising a control unit operable to control the feedback device to regulate an amount of the hot EGR gases led from the combustion chamber back into the combustion chamber on the basis of operating parameters.

15. The engine of claim 10, further comprising a mixing area inside the combustion chamber where the combined quantity of fuel and EGR gases are mixed with the inlet air.

16. A combustion engine of a piston-and-cylinder type and having compression ignition, the engine comprising:
- at least one cylinder with a respective combustion chamber having an outlet, at least one inlet, and working cycles;
- a supply apparatus for supplying a specified quantity of fuel to the combustion chamber for each working cycle in the combustion chamber;
- a feedback device for leading hot EGR gases produced during the working cycles from the combustion chamber, through the outlet, and back to the combustion chamber through the at least one inlet;
- a combining apparatus for combining at least a first portion of the quantity of fuel with at least a first portion of the hot EGR gases from the outlet before the combined quantity of fuel and EGR gases are mixed with inlet air; and
- an injection apparatus for injecting a second portion of the quantity of fuel directly into the combustion chamber without combining the second portion of the quantity of fuel with the hot EGR gases.

* * * * *